United States Patent

Scholten et al.

[11] 4,076,625
[45] Feb. 28, 1978

[54] BAFFLE AND WASH TROUGH ASSEMBLY FOR GRANULAR-MEDIA FILTERS

[75] Inventors: John James Scholten; James Clinton Young, both of Ames, Iowa

[73] Assignee: General Filter Company, Ames, Iowa

[21] Appl. No.: 649,902

[22] Filed: Jan. 16, 1976

[51] Int. Cl.² .......................................... B01D 23/24
[52] U.S. Cl. ................................ 210/274; 210/275; 210/279
[58] Field of Search ............... 210/275, 279, 286, 456, 210/274

[56] References Cited

U.S. PATENT DOCUMENTS

| | | | |
|---|---|---|---|
| 1,892,951 | 1/1933 | Hughes | 210/275 X |
| 2,244,188 | 6/1941 | Danner | 210/279 |
| 2,538,340 | 1/1951 | Tomek et al. | 210/279 |
| 2,888,140 | 5/1959 | Herbert | 210/275 |
| 3,286,842 | 11/1966 | DeJong | 210/275 |
| 3,313,420 | 4/1967 | Hirsch | 210/275 |

Primary Examiner—Frank A. Spear, Jr.
Assistant Examiner—E. Rollins Cross
Attorney, Agent, or Firm—Tilton, Fallon, Lungmus & Chestnut

[57] ABSTRACT

A baffle and wash trough assembly is provided for reducing media loss during high-turbulence washing of granular-media filters. The assembly includes a water collection trough having an overflow weir on at least one side thereof and a lower portion with downwardly and inwardly converging sides, and a baffle supported adjacent one side of the trough; the baffle having an upwardly concave arcuate portion in opposed relation to the trough lower portion, and defining a restricted flow channel for the wash water to the trough. There may also be provided a second baffle supported adjacent the other side of the trough and having an upwardly concave arcuate portion in opposed relation to the other side of the trough lower portion. The lower end of the second baffle preferably terminates above and inwardly of the lower end of the first baffle, thereby defining a second channel for removal of backwash water. The baffle and backwash trough assembly is particularly adapted for use with filters employing simultaneous application of air and water to produce a high turbulence backwash.

14 Claims, 12 Drawing Figures

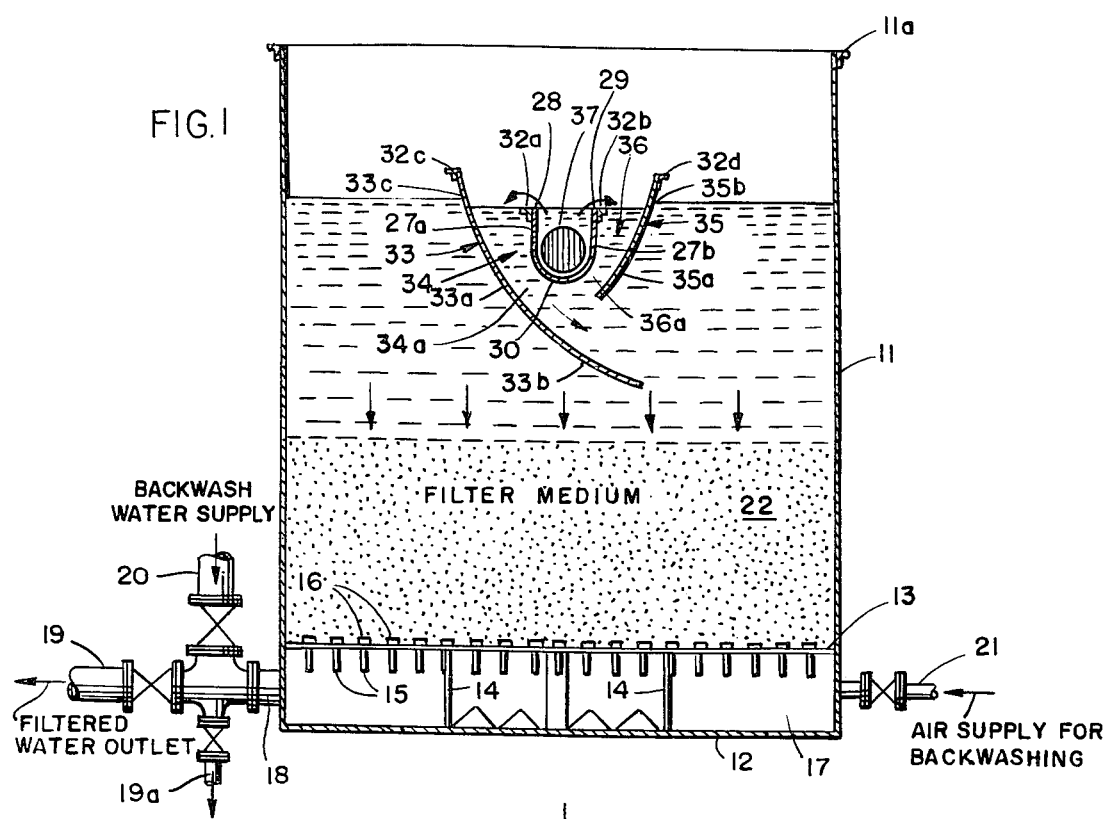
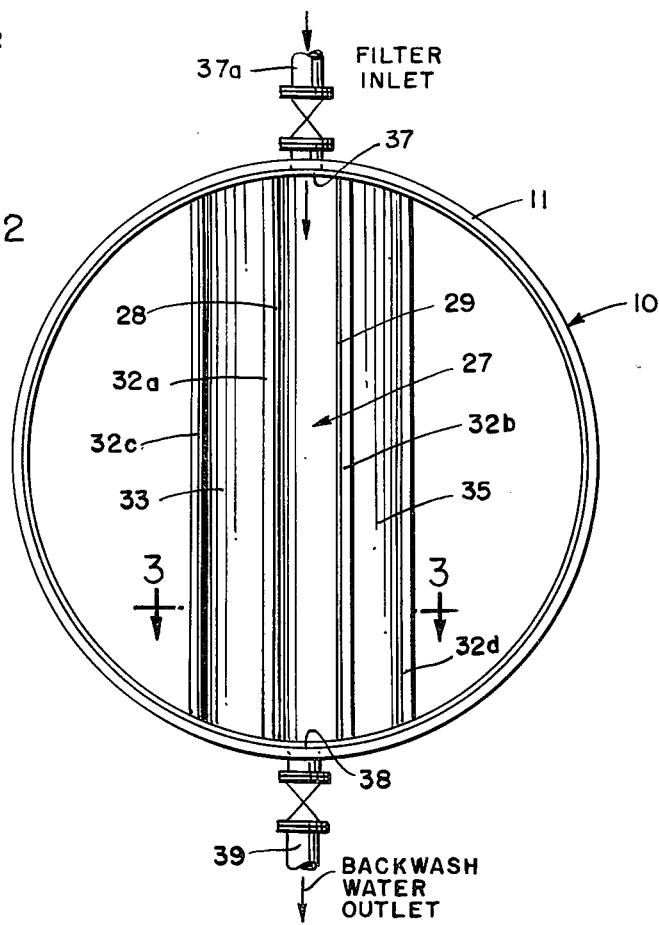

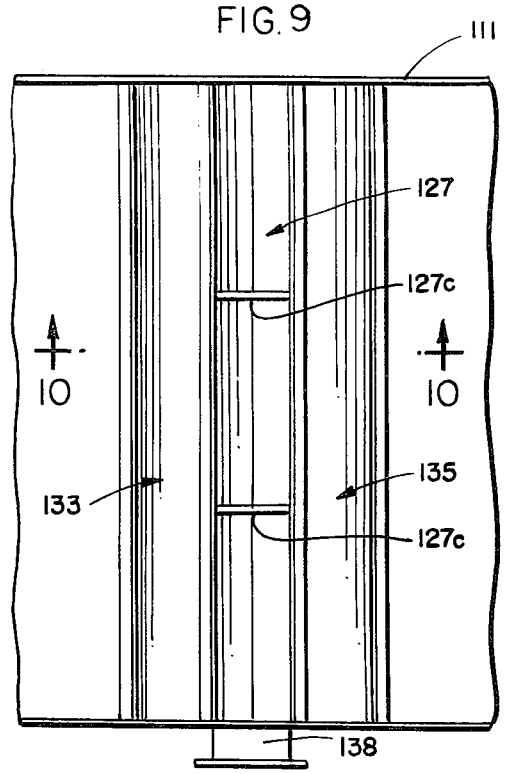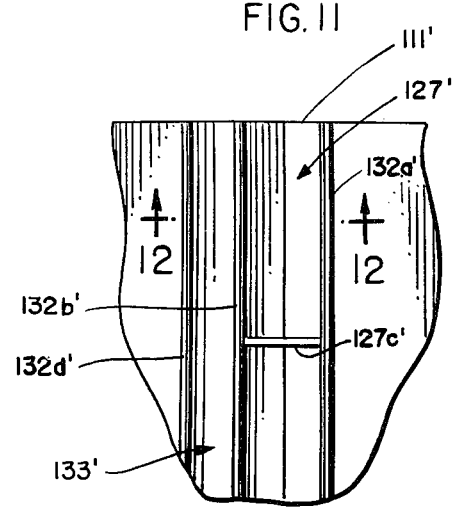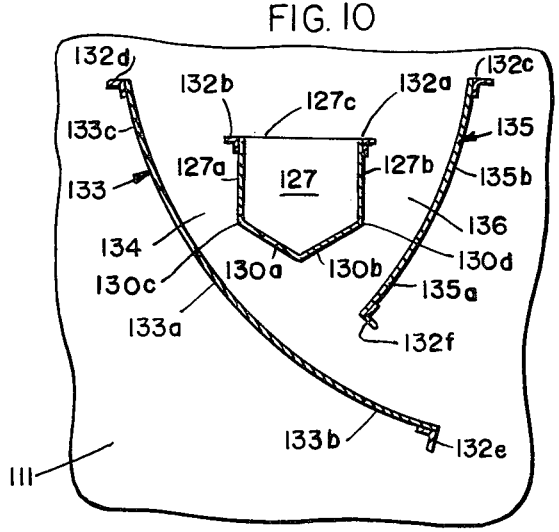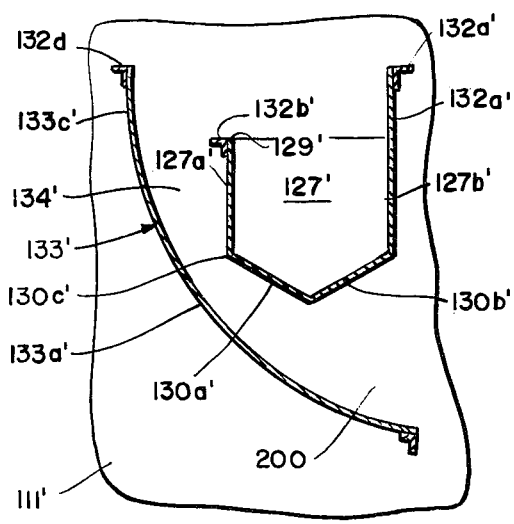

4,076,625

BAFFLE AND WASH TROUGH ASSEMBLY FOR GRANULAR-MEDIA FILTERS

BACKGROUND OF THE INVENTION

Granular-media filters have been used extensively to remove suspended solids from water in water treatment plants. Such filters also are finding widespread application for removing suspended solids from wastewater streams which have had various degrees of pretreatment. The filtered solids are trapped at the surface of the filter bed and in the interstitial spaces within the filter bed. Granular-media filters may be designed and operated with flow in the upward or downward direction, although downflow filters are the more common arrangement.

Granular-media filters are cleaned by a periodic washing operation (so-called "backwashing" for downflow filters) in which water is passed upwardly through the filter bed. The rate of water applied for washing depends on the size of the granular-media and the desired fluidization or bed expansion characteristics. The filters can be cleaned more completely and more efficiently in terms of the completeness of solids removal and the amount of water needed for the washing operation by agitating the bed with air or other means simultaneously with the upward flow of backwash water. However, because of the extreme turbulence caused by this agitation, many particles of media are carried over the discharge edge of the backwash trough and consequently are lost from the filter. Normally there is no way to recover this media.

It has been proposed to employ baffles around the backwash trough or launder to reduce turbulence in the vicinity of the overflow weir, thereby permitting the granular-media carried up with the wash water to settle, or at least not to be carried into the wash trough, and lost from further use in the filter bed. One such device is shown in the United States patent of Row et al No. 2,453,345. As shown in the patent, it consists of a vertical baffle on each side of the launder trough, which define flow channels of uniform cross-section. The trough or launder has a rectangular cross-section. Additional baffles are mounted at the lower corners of the trough to extend outwardly and downwardly beneath the lower ends of the vertical baffles, defining a restricted inlet to the outflow channels. The liquid flow velocity through the outflow channels is controlled so that it does not exceed the settling velocity of the filter bed material. However, it is stated that any filter bed material carried up by the wash liquid is generally carried to a region outside of the flow channels defined by the baffles. It is claimed that loss of filter bed material during washing is substantially eliminated and that washing time and washing fluids are considerably reduced. The launder trough and baffle assembly is said to function equally as well whether a wash liquid is alone used or the wash is a mixture of water and air.

SUMMARY OF THE INVENTION

Close observation of rising air bubbles over a bed of granular filter media showed that the cause of media being carried up with the air and water was not by attachment of air bubbles to the media particles, as might be assumed. It was found that the rising air bubbles, particularly the larger bubbles, formed a suction wake beneath the bubbles as they erupted from the media bed. Media particles were carried up in this wake. While some of the particles would settle immediately, others would continue to follow the bubble on its upward rise. The air bubbles tend to go to the surface of the tank and not into the backwash trough. However, due to turbulence, media particles reaching the surface of the water in the tank in the vicinity of the backwash trough may be carried into the trough and lost from the filter. It was therefore concluded that a baffle and backwash trough assembly to minimize media loss should be designed to effectively separate the rising air bubbles from the outflowing backwash water, and, in general, to provide smooth laminar flow, as distinguished from turbulent flow, through the outflow channels between the baffles and the backwash trough.

In studying the performance characteristics of various trough and baffle configurations, it was discovered that downwardly moving eddy currents on the outside of the vertically-extending baffles can contribute significantly to media loss. Because of the air bubbles rising to the surface of the water in the tank outside of the baffles, upwardly flowing currents are created. However, the entrance to the outflow channels are beneath the surface, namely, adjacent the lower ends of the vertically-extending baffles. This tends to create a reverse flow immediately adjacent the outside of the vertical baffles, the upward flow after release of the air bubbles turning downwardly and producing eddy currents that can contribute to media loss. Where these eddy currents extend to the inlets to the outflow channels at the lower ends of the vertical baffles, turbulent flow conditions are aggravated, and more media particles are swept into and carried through the outflow channels into the trough than would otherwise occur.

As will subsequently be explained in greater detail, by employing arcuate baffles the downwardly flowing eddy currents along the outside of the baffles are diverted, and prevented from causing turbulence at the entrance to the outflow channels. In the preferred design, the baffles have outwardly convex portions, which curve downwardly and inwardly around the lower portion of the backwash trough. Concave inner surfaces of the baffles are opposed to the lower portion of the wash trough. The throats or narrowest cross-sections of the outflow channels are between the opposed curved portions of the baffles and the trough. The overall result is that media loss is reduced, particularly under conditions of high-turbulence backwashing, such as aeration-type backwashing. Because of its anti-turbulence characteristics, the design can also be advantageously employed where the high-turbulence backwashing is achieved with other auxiliary means for agitating the media bed, such as mechanical agitation.

BRIEF DESCRIPTION OF THE DRAWINGS

Illustrative embodiments of water filtration apparatus equipped with baffle and wash trough assemblies constructed in accordance with the present invention are shown in the accompanying drawings, in which --

FIG. 1 is an elevational sectional view of a water filtration apparatus showing a double baffle and wash trough assembly in the upper portion thereof;

FIG. 2 is a top plan view of the apparatus of FIG. 1;

FIG. 9 is a plan view of a modified baffle and wash trough assembly;

FIG. 10 is an enlarged sectional elevational view taken on line 10—10 of FIG. 9;

FIG. 11 is a fragmentary plan view of still another modified wash trough and baffle assembly; and FIG. 12 is an enlarged sectional elevational view taken on line 12—12 of FIG. 11.

DETAILED DESCRIPTION OF INVENTION

Looking first at FIGS. 1 and 2, there is shown a vertically extending tank 10. As illustrated, the tank is formed of metal (viz. steel), but it can be constructed of other materials, such as concrete. It will also be understood that although the tank, as shown, is circular in horizontal cross-section, other shapes may be used.

Figure 6:
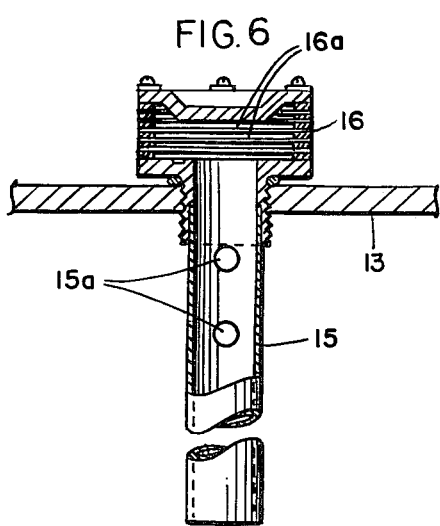
FIG. 6 is an enlarged elevational sectional view of a portion of the underdrain plate of the apparatus of FIG. 1, illustrating a nozzle and strainer for use with a normal filter media.

The tank 10 has an open top, circular side walls 11, and a closed bottom 12. Spaced upwardly from bottom 12 there is provided an underdrain plate 13, supported by bracing 14 and connected to the tank sides 11 by welding to form a water-tight seal therebetween. Extending through plate 13 are a plurality of nozzle tubes 15 having strainer caps 16 on the top thereof above plate 13. During downflow filtration the water passes downwardly through the strainers 16 and the nozzles 15 into the underdrain chamber 17 and is removed through pipe connection 18 to the filtered water outlet pipe 19. The same arrangement can be used for upflow filtration the water to be filtered entering chamber 17, which now serves as a water introduction chamber, rather than as an underdrain chamber, the water then passing upwardly through the nozzle tubes 15 and the strainer cap 16. During washing, water is supplied under pressure through pipe 20 to pipe 18 and chamber 17 for passing upwardly through nozzle tubes 15 and strainers 16. Also during washing, air is preferably supplied under pressure through pipe 21 which connects with underdrain chamber 17. Air enters the nozzles through holes 15a in the upper portions thereof, while water enters through the lower ends of the nozzle tubes. As shown in FIG. 6, the air inlet holes are 15a. Alternate means of adding the air to the filter can be used, for example, as through a distribution grid placed within or immediately below the filter media bed. The pipes 19, 20, and 21 are usually provided with separate shut-off valves as is drainpipe 19a.

Figure 7:
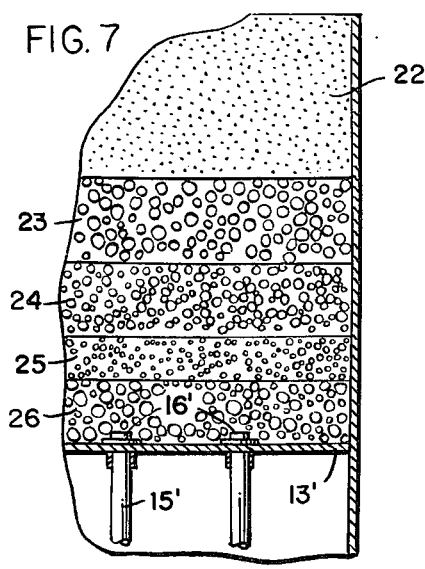
FIG. 7 is an enlarged fragmentary sectional elevational view of a filter bed and underdrain plate, illustrating a reverse graded bed and modified nozzles and strainers for use therewith.
Figure 8:
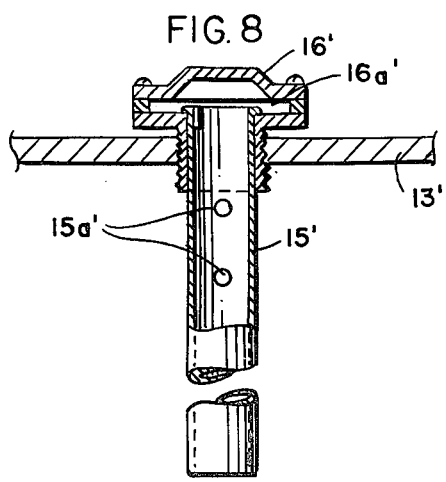
FIG. 8 is an enlarged sectional detailed view of the underdrain plate and one of the modified nozzle and strainers of FIG. 5.

As is well-known in the water filtration art, a filter medium bed 22 of granular filtering material, such as sand, sand and gravel, coal, etc. is provided above plate 13. Where the fine granular material, such as sand, extends to the drain plate 13, a nozzle 15 and strainer 16, as shown in FIG. 6 may be used. The strainer 16 has a series of narrow annular slots 16a through which the water flows while retaining the granular medium above plate 13. The filter medium comprising bed 22 may contain several different filtering materials, such as granular materials of different average size, different density, etc.

Where a bed of sand 22 is supported on layers of reverse graded gravel, as illustrated in FIG. 7, strainers 16' above plate 13' may be used on the tops of nozzles 15', as shown more clearly in FIG. 8. These nozzles have wider circumferential opening 16a'. With respect to the reverse graded gravel, for example, the layer 23 immediately beneath the sand bed 22 may be a 4 inch depth of gravel graded to an average size of about ¾ by 1 inches. The next lower layer 24 may be a 2½ inch depth of gravel graded to an average size of one-half by one-fourth inches, followed by a layer 25 of 2½ inch depth of gravel graded to an average size of one-fourth by one-eighth inches. The lowest layer of gravel 26 in contact with underdrain plate 13 may be formed of a larger size gravel, such as a 4 inch depth of gravel graded to an average size of one-half by one-fourth inches. It will be understood that these figures are merely illustrative of reverse graded layers of gravel, and that both the size of the gravel in the layers and the depth of the layers may be varied widely.

Figure 3:
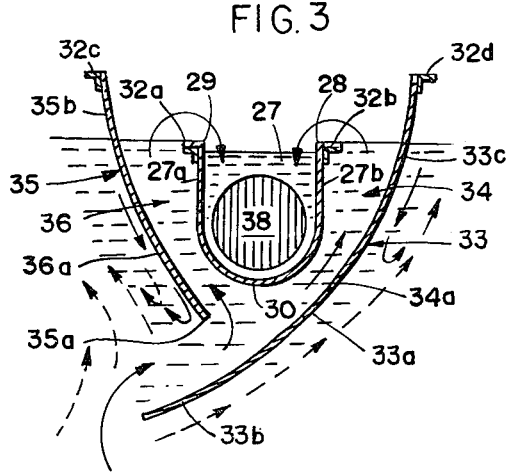
FIG. 3 is a detailed sectional view taken on line 3—3 of FIG. 2, showing the double baffle and trough assembly as it would appear during washing, the flow patterns being indicated by arrows.

Returning to FIGS. 1 and 2, the baffle and wash trough assembly of this invention will now be described. A wash water collection trough 27 is supported to extend horizontally across the upper portion of tank 10. Trough 27 has an upper edge on at least one side thereof functioning as an overflow weir. As shown in FIGS. 1 and 2, trough 27 provides overflow weirs on both sides thereof, being respectively designated by the numbers 28 and 29. It has been found desirable to have the sides of the lower portion of trough 27 converge downwardly and inwardly. For example, as shown in FIGS. 1 and 3, the lower portions 30 of trough 27 can be formed with inwardly and downwardly curving portions, the trough bottom thereby having an outwardly convex curvature. Alternatively, as will subsequently be described, the trough bottom may have a V-shaped configuration. The orientation of sidewall portions 27a and 27b is not critical, and they may incline inwardly or outwardly by 5 to 15° with respect to the vertical, although there is no particular advantage in such inclination.

The weir edges 28 and 29 may be reinforced by angle irons 32a and 32b which, as shown in FIG. 2, extend along the flow length of the weirs and connect to the side walls 11 of the tank, as does the ends of the trough 27. The ends of the angle irons and trough can be connected to walls 11 by welding, or other suitable means, depending on the materials of construction employed. There is preferably a substantially water-tight seal between the ends of trough 27 and the tank walls. As will be noted, trough 27 is supported at its ends only. Intermediate bracing may be employed on long troughs, such as cross-bracing between the upper edge portions.

A first arcuate baffle 33, hereinafter sometimes referred to as the long baffle, is supported adjacent to one side of the trough, such as the side 27a, in spaced relation to the trough and extending horizontally along the weir edge 28. Baffle 33 has an upwardly concave arcuate portion 33a in opposed relation to the trough lower portion 30 on one side thereof. Baffle 33 also includes a portion 33b extending below the trough bottom and a portion 33c extending to a level above weir edge 28, thereby defining a restricted flow channel 34 for the passage of the backwash water into trough 27. The opposed arcuate portion 33a preferably merges smoothly with lower portion 33b and upper portion 33c. As shown, channel 34 has its minimum cross-section or "throat", as indicated at 34a between baffle portion 33a and the adjacent outward surface of trough bottom portion 30. As preferred, channel 34 converges in cross-section below throat 34a and diverges in cross-section thereabove. However, the enlarging cross-section of the upper portion of channel 33 is not critical, and in some embodiments, this portion of the channel may have a substantially uniform cross-section.

A second baffle 35, sometimes referred to herein as the short baffle, is supported adjacent the other side of the trough (side 27b) and extends horizontally along weir edge 29. Baffle 35 has an upward concave arcuate portion 35a in opposed relation to the other side of trough lower portion 30. Baffle 35 also includes a portion 35b extending to a level above weir edge 29, thereby defining a second restricted flow channel 36 for the passage of backwash water into the trough 27. The lower end of baffle 35 terminates above and spaced from the lower end portion 33b of the first baffle. In other words, the lower end portion of baffle 35 preferably overlies the portion 33b of the first baffle. Baffle portions 35a and 35b preferably merge smoothly. In the embodiment shown, baffle 35 is arcuate throughout its vertical extent, as is the first baffle 33. However, in some embodiments, the upper or lower end portions of both baffles may have little or no curvature.

Preferably, the second flow channel 36 has its minimum cross-section or "throat", as indicated at 36a between arcuate portion 35a and the adjacent outwardly convex surface of trough bottom 30. As shown, the second channel 36 above throat 36a may diverge in cross-section. However, in some embodiments, the uppermost portion of channel 36 may have a substantially uniform cross-section.

As shown more clearly in FIG. 2, the arcuate baffles 33 and 35 extend to the walls 11 of the tank. The outer ends of baffles 33 and 34 are connected to the tank walls or to mounting brackets to provide a rigid mounting, such as by welding. Angle iron braces 32 may also be provided, being connected to the top edge portions of the baffles by welding. As illustrated, there are no connections, such as cross-braces, between baffles 33 and 35 and trough 27. With this construction, the channels 34, 36, remain open and unobstructed. In some installations where necessary for mechanical strength, cross-bracing between the baffles and the trough may be employed in such manner as to cause minimum or negligible flow obstruction.

It will be understood that as required by tank size, a plurality of the baffle and backwash trough assemblies will be used.

OPERATION

In the operation of the apparatus of FIGS. 1-3, for the filtration cycle the water to be filtered can be introduced into the trough 27, such as from an inlet 37 located at one end of the trough 27. A water inlet pipe 37a may be connected through a valve to the inlet 37 (FIG. 2). The water to be filtered will fill the trough 27, overflowing the weir edges 28, 29, in an outward direction, as indicated by the arrows in FIG. 1. The water will then flow downwardly through the channel 34, 36, and maintain a water level within tank 10 above the bed of filter media 22. The upper level of the water may be at about the same level as the overflow weirs 28, 29. It also may be substantially above or below this level depending on type of filter control employed. This inlet arrangement is convenient for use in conjunction with the baffle and backwash trough assembly of this invention, but other water inlet arrangements can be used.

Looking now at FIG. 3, the operation of the filter during backwashing will be explained. As will be noted, FIG. 3 is a sectional view looking in the opposite direction from that of FIG. 1, the section being taken on line 3—3 of FIG. 2. At the other end of the trough 27 from the inlet 37, there is provided a backwash water outlet 38, as shown in FIGS. 2 and 3. Outlet 38 is connected to a backwash water outlet pipe 39 through a valve, as shown in FIG. 2. For backwashing, the valve on the filtered water outlet line 19 is closed and the valve on the backwash water supply line 20 is opened, and, of course, the valve on the filter drain line 19a is also closed. The valve on the air supply line 21 is also opened, so that air under pressure overlies the backwash water in underdrain chamber 17 in communication with the holes 15a, and air and water thereby pass upwardly under high-turbulence through nozzles 15 and strainers 16 into the bed of granular media 22. This effects agitation of the bed and progressively removes the solids which accumulated in the bed during filtration.

The predominant air and water flow patterns during backwashing are illustrated diagrammatically by the arrows in FIG. 3. The dotted arrows indicate flow paths of the aeration air, while the solid arrows indicate water flow paths. More specifically, as the mixture of water, air, and suspended solid matter, including particles of the media, pass upwardly to the level of the lower end portion 33b of the long baffle, a flow separation occurs. The air bubbles, which are carrying along media particles in a suction wake, tend to flow predominantly toward the surface of the water in the tank outside of the baffles 33 and 35 as indicated by the dotted arrows, such flows occur near the outsides of the baffles 33 and 35. The backwash water, carrying the fine solids which accumulated in the filter media, flows around the lower end 33b of baffle 33 and divides into two streams, one passing upwardly through the channel 34 and the other through the channel 36. These flows are indicated by the solid arrows. Some particles of the filter media are also carried into the channels 34 and 36, but by controlling the upflow velocity in these channels so that the velocity in the throat areas, 34a and 36a, is less than the settling velocity of the particles of filter media, the media particles will settle out of the channels. Since the sides of the flow channels, as defined by the inside surfaces of the baffles 33, 35 and the outside surfaces of the trough 27, as designed to promote smooth flow, the effects of turbulence and pulsating flow are effectively controlled. A substantial reduction in media loss is thereby obtained. At the same time, the bed of filter media can be thoroughly cleaned with the removal of the accumulated fine solids. The particle size of this material is fine enough that it is carried upwardly by the water flow in the channels 34, 36 and is removed with the backwash water through trough 27.

The flow pattern around the baffles produce another effect of considerable importance in reducing media loss. After the release of the air at the surface of the water in the tank outside of the baffles 33, 35, downward flows of water tend to occur along the outsides of the baffles. These downward flows or eddy currents carry relatively large amounts of the granular media, since most of the media lifted from the bed follows the flow of the air bubbles. Once the air is released, particles of media tend to settle, and follow the downward water flows along the outside of the baffles, as indicated by the solid arrows in this location in FIG. 3. This effect is particularly severe when using vertical outer baffles. These downwardly moving eddy currents have an inherent tendency to produce turbulence at the entrance to the channels 34, 36. Further, since the eddy currents contain particles of the filter media, a turbulent mixing action can occur, which will result in media being carried into and through the channels 34, 36, thereby being lost with the backwash water. With the present invention, however, this result is substantially avoided. This appears to be due to the inward and downward inclination or curvature of the baffles 33, 35. With the long baffle 33, the eddy currents tend not to occur and if they occur tend to reverse along the upper portion of the outside of the baffle, and before the eddy currents reach the lower end of the baffle, as indicated diagrammatically by the solid flow arrows in this location in FIG. 3.

With the short baffle 35, the eddy currents move down further, but tend to reverse adjacent the lower end portion 35a, as indicated by the solid flow arrows in this location in FIG. 3. These reversals of the eddy currents cause the granular media to be swept away from the entrance to the channels 34, 36, the media particles being carried upwardly and outwardly with the flows of air bubbles. To obtain this result, the inward and downward inclination, or curvature of the short baffle 35, as well as that of the long baffle 33 is important. If these baffles were vertical a larger loss of filter media would occur.

MODIFICATIONS

Figure 4:
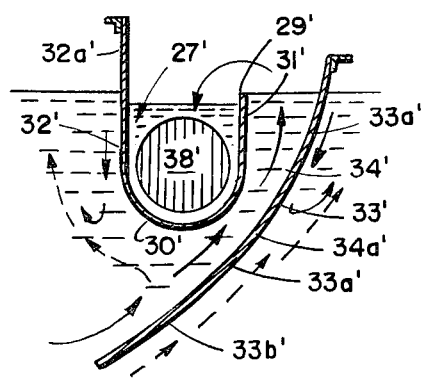
FIG. 4 is an elevational sectional view similar to FIG. 3, except that a modified form of the assembly is illustrated, only one baffle being provided.

In FIG. 4 there is shown a modification of the baffle and trough assembly of this invention. For convenience of reference, corresponding parts have been given the same numbers, except that the numbers have been primed. The assembly includes only a single baffle 33', corresponding to the long baffle 33 of the double baffle assembly of FIG. 3. In other words, the short baffle 35 has been omitted. The side 32' of trough 27' has been extended upwardly above the level of overflow weir 29', the upwardly extending portion being designated as 32a'. This upward extension prevents water carrying media from splashing over the top edge of side 32', since this edge is now unprotected by a baffle. The overflow of backwash water into the trough 27' therefore occurs only over the weir edge 29' at the top of the other side 31'.

With the modification of FIG. 4, a similar protective action is obtained. The eddy currents moving downwardly along the outside of the baffle 33' tend to reverse, as previously described in connection with the long baffle 33. This is indicated by the flow arrows in FIG. 4 in this location.

The downward flow of eddy currents along the outside of trough wall 32' also reverse due to the inward and downward curvature of the trough bottom portions 30'. This reversal is also indicated by the flow arrows in that location. If the trough walls 32' extended vertically downwardly to the level of the bottom thereof and the curved bottom portion was eliminated on that side, a substantially greater media loss would occur.

Figure 5:
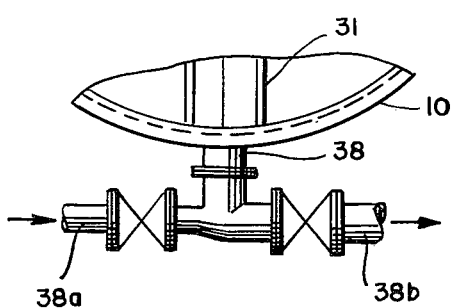
FIG. 5 is a fragmentary detailed plan view illustrating a modification of the water inlet and outlet for the trough.

The wash troughs may have water connections at one end only, for example, as indicated in FIG. 5, the water pipe 38 connected to the end of trough 31 in tank 10, which was previously described a wash water outlet pipe may serve both that purpose and also for the introduction of the water to be filtered. A T-connection is provided with pipe 38, providing a valved inlet pipe 38a and a valved outlet pipe 38b. Usually, as shown, the water inlet pipe 38a will be of smaller diameter than the water outlet pipe 38b.

FIGS. 9 to 12 illustrate modifications in which the wash trough has a V-shaped bottom portion. In the modification of FIGS. 9 and 10, corresponding parts have been given the same numbers, except that the numbers have been increased by 100. The tank 111 is of rectangular rather than circular configuration. The water outlet 138 is also used as an inlet for the water to be filtered, as described in connection with FIG. 5. Because of the length of the trough 127, longitudinally spaced cross-braces 127c are provided. Further, as shown in FIG. 10, the lower ends, respectively, of long baffle 133 and short baffle 135 are provided with re-enforcing angle irons 132e and 132f.

The principal modification of the embodiments of FIGS. 9 and 10 is shown best in FIG. 10, where it can be seen that the trough bottom has a V-shaped configuration, being composed of the downwardly and inwardly converging sides 130a and 130b. As shown, side 130a is in opposed relation to arcuate baffle portion 133a, while bottom portion 130b is in opposed relation to arcuate baffle portion 135a. Bottom portion 130a meets side 127a at corner 130c, while bottom portion 130b meets side 127b at corner 130d. The throat of channel 134 is between baffle portion 133a and corner 130c, while the throat of channel 136 is between corner 130d and baffle portion 135a.

FIGS. 11 and 12 illustrate the use of a trough having a V-shaped bottom in a single baffle arrangement. For convenience of reference, corresponding numbers have also been increased by 100, but the numbers have been primed to indicate the further modification. The trough side 127b' has an upwardly extending portion opposite the weir edge side 127a'. The bottom of trough 127' has downwardly and inwardly inclined portions 130a' and 130b'. Portion 130a' is opposed to arcuate baffle portion 133a', and the throat of channel 134' is between corner 130c' and arcuate baffle portion 133a'.

In one preferred method of operation of filters equipped with the baffle and wash trough assembly of this invention, a single material, such as substantially uniformly graded sand, coal, or gravel, is used for the filter medium bed. Such a single material bed is illustrated in FIG. 1. By employing a combined air-water backwash, a coarser single filter material can be employed than would otherwise be possible. In such a filter, the combined air-water backwash causes thorough mixing of the filter material and prevents stratification that can occur when using only a water backwash, or an air wash followed by a water wash. Such complete medium mix insures true in-depth filtration and longer filtration runs. This is because the interstitial spaces are uniform throughout the bed, allowing the solids to penetrate the bed. This is in opposition to a stratified bed which has the smaller media particles at the top of the bed; thus smaller interstitial spaces, which catch and hold the solids at or near the media surface. This causes "blinding" of the filter with raped head loss development, thus, short filter runs. Moreover, high interstitial velocity scours the attached solids from the surface of the filter medium, and the combined air-water action is very effective in transporting both light and heavier solids to the backwash collector during backwashing. At the same time, the baffle and wash trough assembly separates the air and medium from the wash water at the wash water collector without interfering with removal of accumulated suspended solids. Loss of filtering material is reduced to levels less than or comparable to use of only water in the backwash procedure.

Superior cleaning action is due in part to the pumping action of the air-water wash. Filtering material at the bottom of the bed at the start of the wash cycle moves to the top of the bed and back down again during a normal wash cycle. This means that all of the filtering material passes through the high turbulence zone during the wash cycle. The high turbulence zone occurs from the "at rest" surface level of the medium to the water surface. With this system, the washout of the accumulated solids is by the dilution action of the wash water. Further, because of the combined air-water action, the released solids are uniformly suspended in the filter tank air-water mixture, i.e., the concentrations in the remote areas of the filter are the same as that in the water entering the throat areas of the baffles. Consequently, the solids removal follows a typical washout or dilution curve. This is different than a water wash filter. Because of the relatively constant concentration of suspended solids across the filter tank, the water collection troughs may be fewer in number and/or more widely spaced apart than in conventional water wash filters. Another advantage of the combination is that the backwash water collector trough can be located at a standard height, thereby keeping the required filter sidewall height to a minimum.

We claim:

1. Water filtration apparatus of the kind providing a vertically-extending tank having a filter medium bed of granular filtering material supported in the lower portion thereof, and means for washing said bed, said washing means including means for passing water upwardly through said bed and additional means for increasing the agitation of said filter material while said wash water is passed therethrough, wherein the improvement comprises at least one baffle and wash trough assembly for reducing filtering material loss during washing, comprising:
   a. a wash water collection trough supported in said tank to extend horizontally across the upper portion thereof, said trough having upwardly-extending side portions and an upper edge on at least one side thereof functioning as an overflow weir, the lower portion of said trough converging downwardly and inwardly from each side thereof; and
   b. substantially imperforate baffle means supported adjacent each weir-providing side of said trough in spaced relation thereto and extending horizontally along the adjacent weir edge, each baffle means having an upwardly concave arcuate portion in opposed relation to said trough lower portion on the adjacent side thereof, said baffle means also including a portion extending below said trough and a portion extending to a level above the adjacent weir edge, each baffle means providing an open-bottom restricted flow channel into said trough for backwash water, said lower and upper portions of said baffle means merging smoothly with said opposed arcuate portion.

2. The apparatus improvement of claim 1 in which said wash trough provides on the other side of the top thereof a second one of said weir edges, and there is also provided a second baffle means supported adjacent said other side of said trough and extending horizontally along said second weir edge, said second baffle means having an upwardly concave arcuate portion in opposed relation to the other side of said trough lower portion, said second baffle means including a portion extending to a level above said second weir edge to define a second restricted flow channel into said trough for the wash water, the lower end of said second baffle means terminating above and spaced from said first-mentioned baffle means lower portion and inwardly of the lower end of said first-mentioned baffle means.

3. The apparatus improvement of claim 1 in which said baffle means is supported by attachment to the walls of said tank without attachment to said trough so that said channel is unobstructed.

4. The apparatus improvement of claim 2 in which said trough, said first-mentioned baffle means, and said second baffle means are supported without attachment to each other, the outer ends thereof being attached to the walls of said tank, whereby said channels can remain open and unobstructed.

5. Water filtration apparatus of the kind providing a vertically-extending tank having a filter medium bed of granular filtering material in the lower portion thereof, underdrain means beneath said bed for collecting filtered water passing downwardly through said bed, and means for backwashing said bed of filtering material under high-turbulence, said high-turbulence backwashing means including means for passing water upwardly through said bed and aeration means for agitating said filtering material while said backwash water is being passed therethrough, wherein the improvement comprises at least one baffle, and backwash trough assembly for reducing filtering material loss during backwashing, comprising:
   a. a backwash water collection trough supported in said tank to extend horizontally across the upper portion thereof, said trough having upwardly-extending side portions and an upper edge on at least one side thereof functioning as an overflow weir, and the lower portion of said trough converging downwardly and inwardly from each side thereof; and
   b. substantially imperforate arcuate baffle means mounted adjacent to said one side of said trough in spaced relation thereto and extending horizontally along said weir edge, said baffle means having an upwardly concave portion in opposed relation to said trough lower portion on said one side thereof, said baffle means also including a portion extending below said trough bottom and a portion extending to a level above said weir edge, said baffle means providing an open-bottom restricted flow channel into said trough for backwash water, said lower and upper portions of said baffle means providing channel portions, respectively, of converging cross-section below said opposed portion and diverging cross-section hereabove.

6. The apparatus improvement of Claim 5 in which said baffle means is supported by attachment to the walls of said tank without attachment to said trough so that said channel is unobstructed.

7. The apparatus improvement of claim 5 in which said trough lower portion has an outwardly convex curvature.

8. The apparatus improvement of claim 5 in which said trough lower portion is V-shaped.

9. The apparatus improvement of Claim 5 in which said wash trough provides on the other side of the top thereof a second one of said weir edges, and there is also provided a second substantially imperforate baffle means supported adjacent said other side of said trough and extending horizontally along said second weir edge, said second baffle means having an upwardly concave arcuate portion in opposed relation to the other side of said trough lower portion, said second baffle means including a portion extending to a level above said second weir edge, said second baffle means providing a second restricted flow channel into said trough for the wash water, the lower end of said second baffle means terminating above and spaced from said first-mentioned baffle means lower portion and inwardly of the lower end of said first-mentioned baffle means.

10. Water filtration apparatus of the kind providing a vertically-extending tank having a filter medium bed of granular filtering material in the lower portion thereof, underdrain means beneath said bed for collecting filtered water passing downwardly through said bed, and means for backwashing said bed under high-turbulence, said high-turbulence backwashing means including means for passing water upwardly through said bed and aeration means for agitating said filtering material while said backwash water is being passed therethrough, wherein the improvement comprises at least one baffle and backwash trough assembly for reducing filter material loss during backwashing, comprising:

a. a backwash water collection trough supported in said tank to extend horizontally across the upper portion of said tank, said trough having upper edges on both sides thereof functioning as overflow weirs, the lower portion of said trough converging downwardly and inwardly from each side thereof;

b. first arcuate baffle means mounted adjacent one side of said trough in spaced relation thereto and extending horizontally along its weir edge, said first baffle means having an upwardly concave portion in opposed relation to said trough lower portion on said one side thereof, said first baffle means also including a portion extending below said trough bottom and a portion extending to a level above said weir edge to define a restricted flow channel into said trough for backwash water, said lower and upper portions of said first baffle means providing channel portions, respectively, of converging cross-section below said opposed portion and diverging cross-section thereabove; and c. second arcuate baffle means supported adjacent the other side of said trough and extending horizontally along said second weir edge, said second baffle means having an upwardly concave arcuate portion in opposed relation to the other side of said trough lower portion, said second baffle means also including a portion extending to a level above said second weir edge to define a second restricted flow channel into said trough for the backwater, the lower end of said second baffle means terminating above and spaced from said first baffle means, said second channel having its minimum cross-section within the portion thereof between said opposed portion of said second baffle means and said trough bottom portion, the cross-section of said second channel enlarging upwardly from said minimum cross-section.

11. The apparatus improvement of claim 10 in which said trough, said first baffle means, and said second baffle means are supported without attachment to each other, the outer ends thereof being attached to the walls of said tank, whereby said channels can remain open and unobstructed.

12. The apparatus improvement of claim 10 in which said trough lower portion has an outwardly convex curvature.

13. The apparatus improvement of claim 10 in which said trough lower portion is V-shaped.

14. The apparatus improvement of claim 10 in which said filter medium bed is composed of a single granular filtering material.

* * * * *